Feb. 27, 1945.  L. R. WILLIAMSON  2,370,384
BORING MACHINE
Filed March 13, 1942   14 Sheets-Sheet 1

INVENTOR.
LARKIN R. WILLIAMSON
BY
ATTORNEYS.

Feb. 27, 1945.   L. R. WILLIAMSON   2,370,384
BORING MACHINE
Filed March 13, 1942   14 Sheets-Sheet 3

INVENTOR.
LARKIN R. WILLIAMSON
BY
ATTORNEYS

Feb. 27, 1945.　　　　L. R. WILLIAMSON　　　　2,370,384
BORING MACHINE
Filed March 13, 1942　　　14 Sheets-Sheet 4
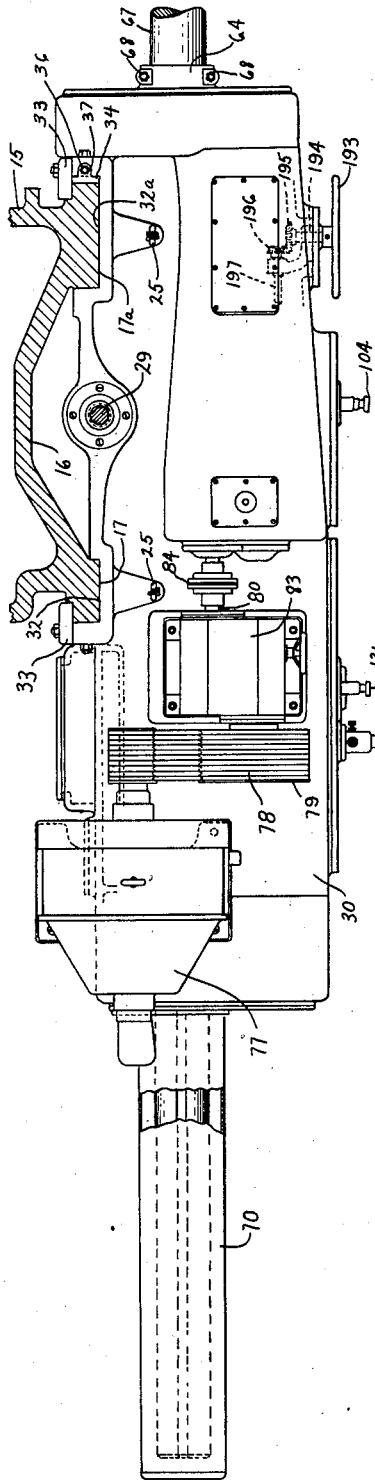
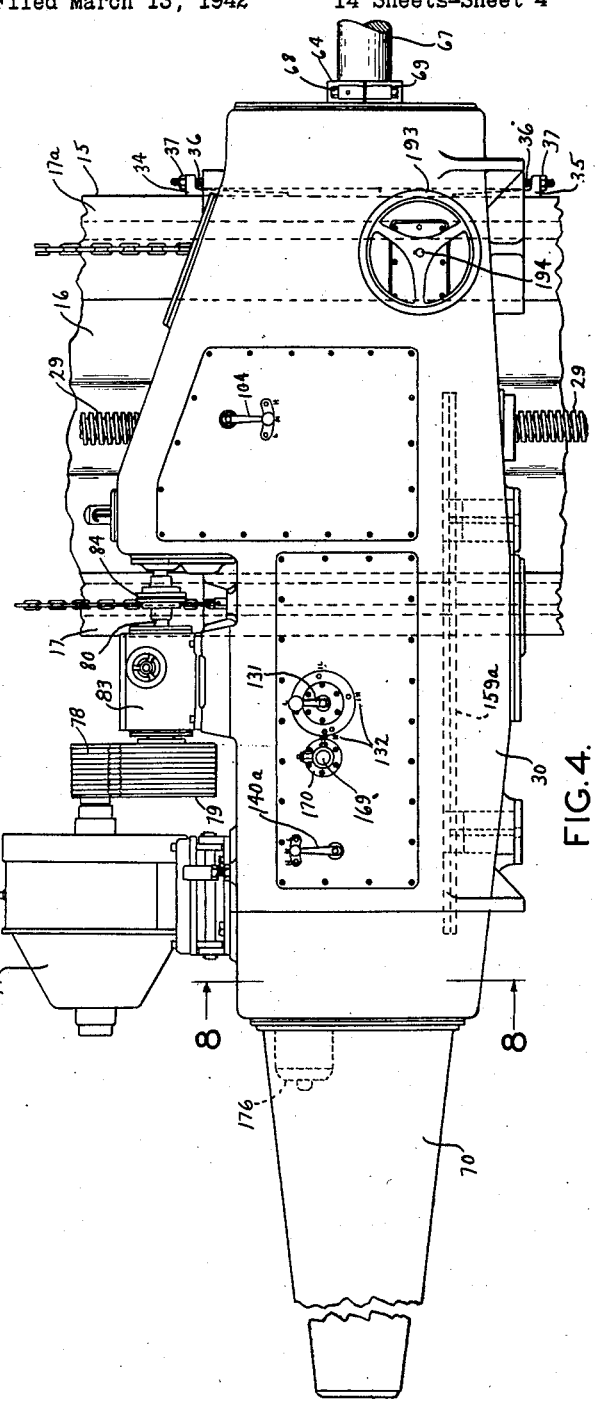
INVENTOR.
LARKIN R. WILLIAMSON.
BY
ATTORNEYS.

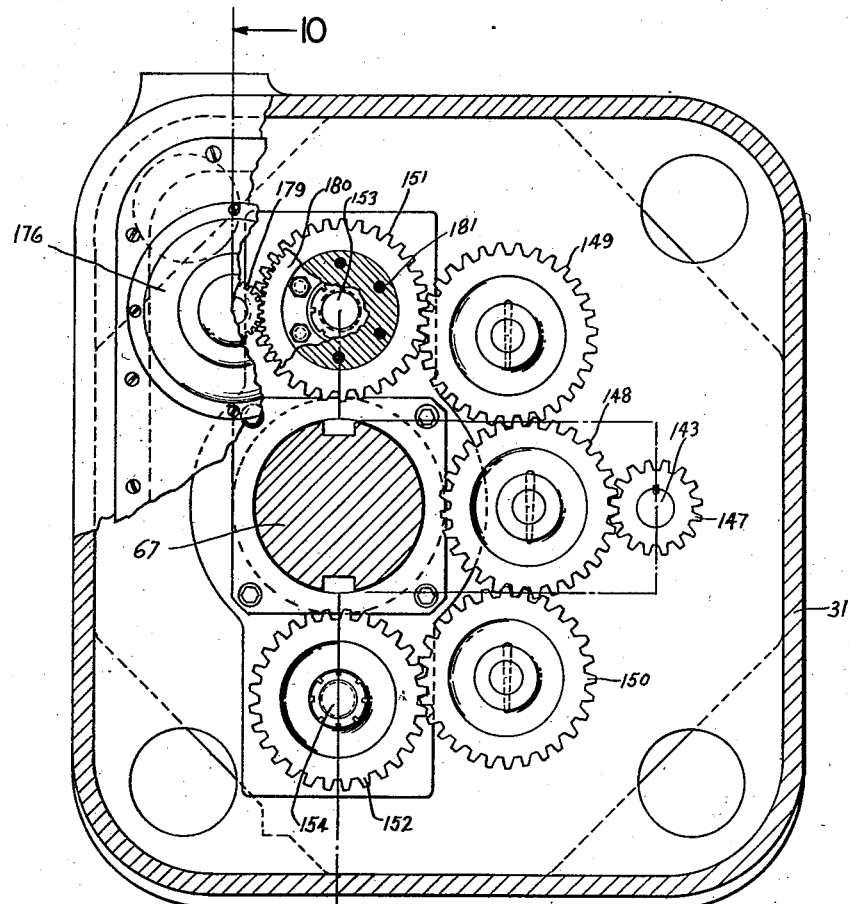
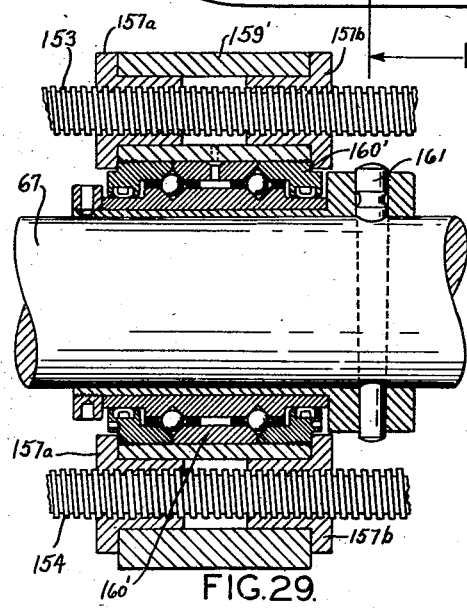
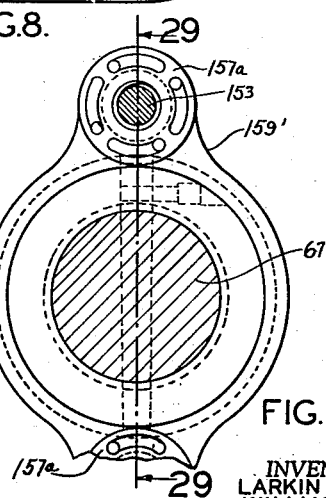

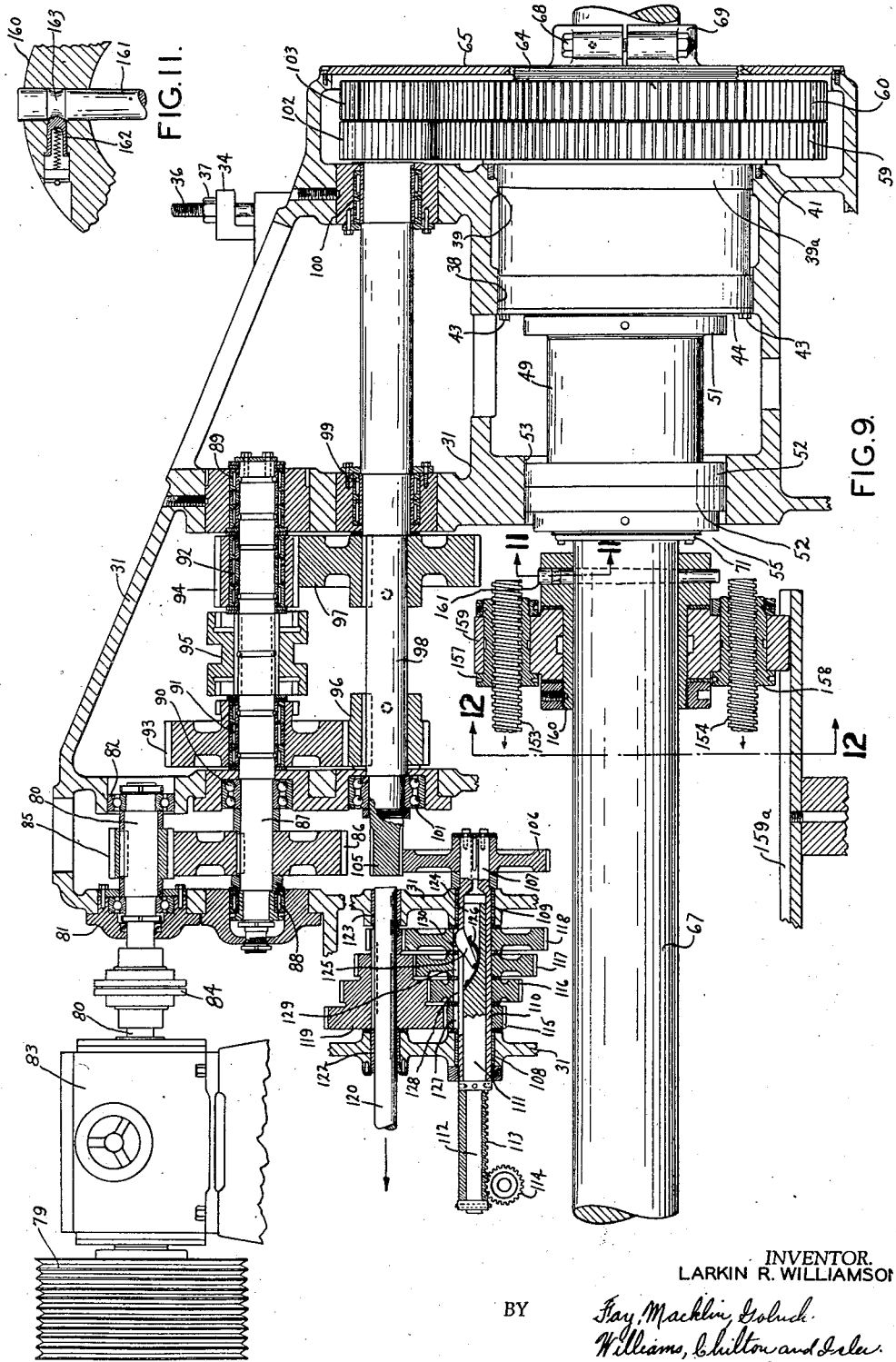

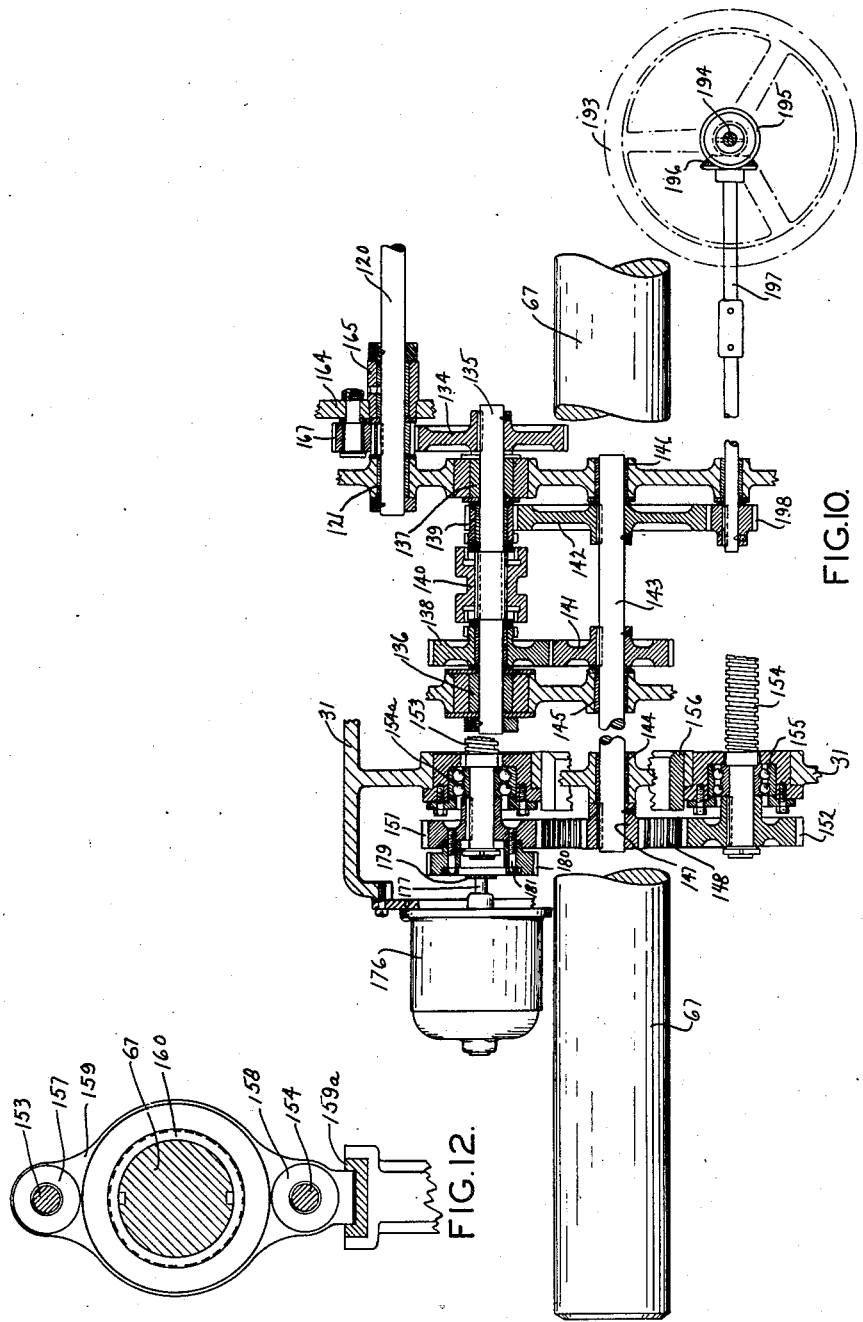

Feb. 27, 1945.                L. R. WILLIAMSON                2,370,384
                                BORING MACHINE
            Filed March 13, 1942              14 Sheets-Sheet 8

INVENTOR.
LARKIN R. WILLIAMSON
BY
Fay, Macklin, Golrick
Williams, Chilton and Isler.
ATTORNEYS.

Feb. 27, 1945.  L. R. WILLIAMSON  2,370,384
BORING MACHINE
Filed March 13, 1942   14 Sheets-Sheet 9
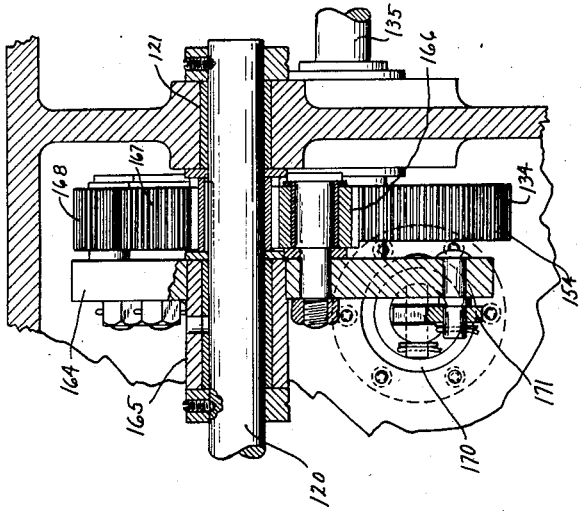
INVENTOR.
LARKIN R. WILLIAMSON
ATTORNEYS.

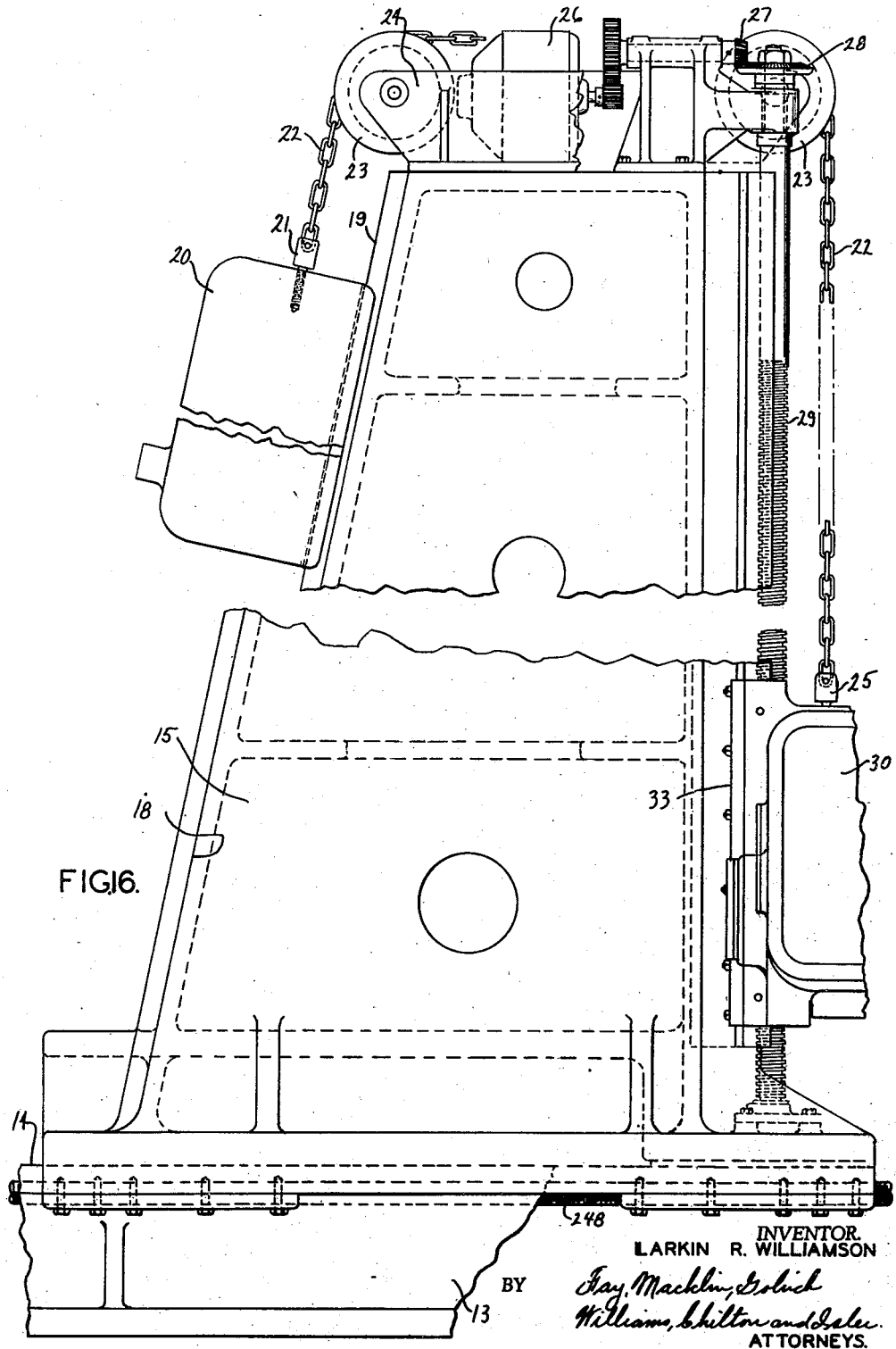

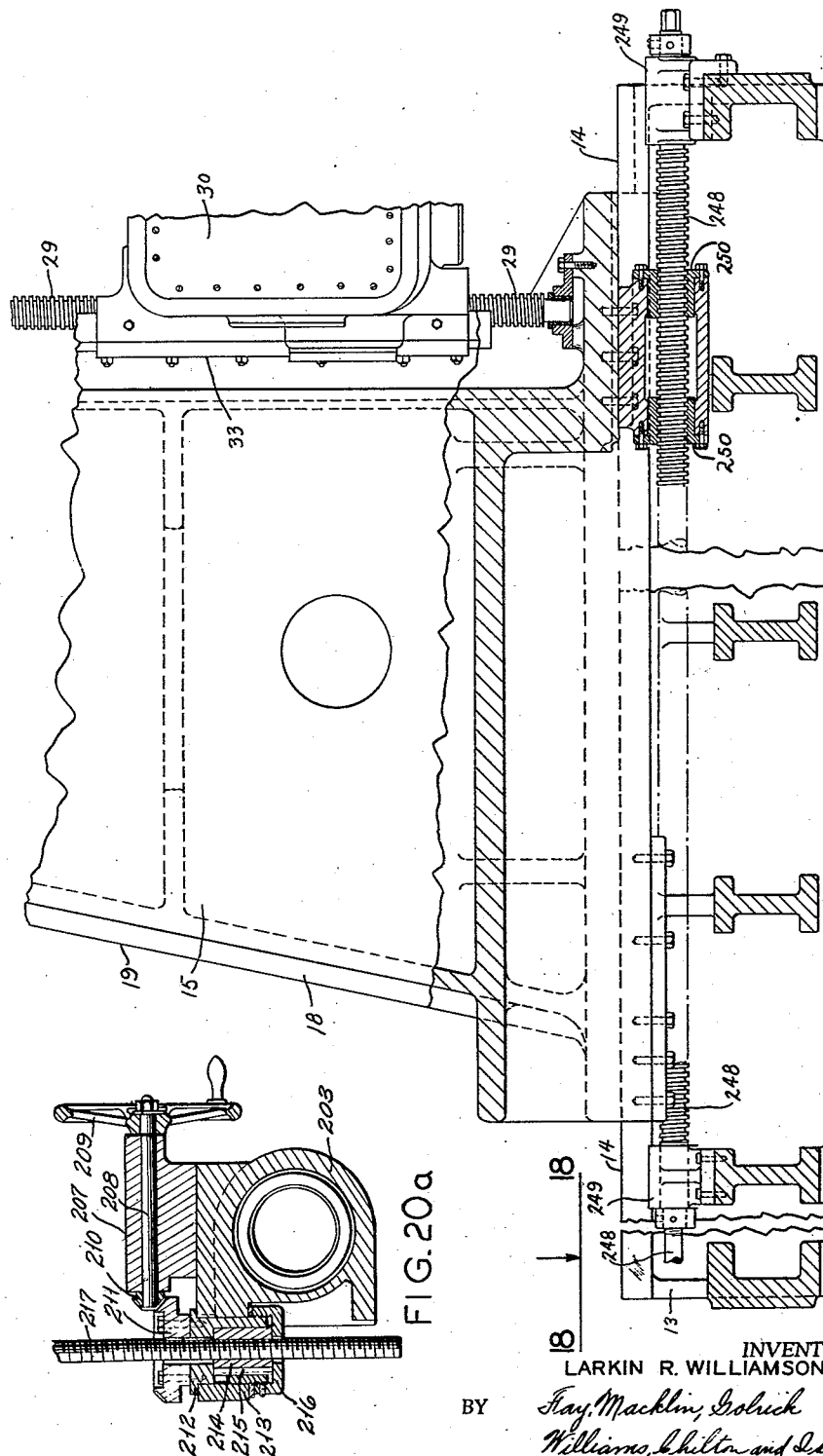

Feb. 27, 1945.   L. R. WILLIAMSON   2,370,384
BORING MACHINE
Filed March 13, 1942   14 Sheets-Sheet 12

INVENTOR.
LARKIN R. WILLIAMSON
BY
ATTORNEYS

Feb. 27, 1945.  L. R. WILLIAMSON  2,370,384
BORING MACHINE
Filed March 13, 1942  14 Sheets-Sheet 14

INVENTOR
LARKIN R. WILLIAMSON.
BY
ATTORNEYS

Patented Feb. 27, 1945

2,370,384

UNITED STATES PATENT OFFICE 2,370,384

BORING MACHINE

Larkin R. Williamson, Brooklyn, N. Y., assignor to E. W. Bliss Company, Brooklyn, N. Y., a corporation of Delaware Application March 13, 1942, Serial No. 434,530

5 Claims. (Cl. 77—3)

This invention relates, as indicated, to a boring machine, but has reference more particularly to a boring machine of the horizontal type, and which is adapted for other machining operations, such for example as drilling and milling.

A primary object of the invention is to provide a machine of the character described, the movements of which can be quickly and easily controlled, so as to facilitate the various operations of the machine as well as the setting and adjustment of the various operative parts thereof.

Another object of the invention is to provide a machine of the character described, having means for readily adjusting the level of the work table and head bed, and for anchoring these parts to a foundation.

Another object of the invention is to provide a machine of the character described, having novel means for supporting and balancing the boring head and for vertically adjusting the boring head.

Other objects of the invention are the provision of a boring head of novel construction; means for rotating the boring bar at a multiplicity of different speeds; means for feeding the boring bar at a variety of different speeds; means for causing a rapid traversing movement of the boring bar; means for quickly and easily reversing the direction of movement of the boring bar; means for hand feeding the boring bar; a novel tail stock, and means for adjusting the position of the head and tail stocks.

To the accomplishment of the foregoing and related ends, said invention, then, consists of the elements hereinafter fully described and particularly pointed out in the claims; the annexed drawings and the following description setting forth in detail certain structure embodying the invention, such disclosed elements constituting, however, but one of the various structural forms in which the principle of the invention may be used.

In said annexed drawings:

Fig. 4 is a front elevation of the boring head;

Fig. 5 is a plan view of the boring head;

Fig. 8 is a transverse cross-sectional view, taken on the line 8—8 of Fig. 4;

Fig. 9 is a cross-sectional view, taken on the line approximately indicated by the line 9—9 of Fig. 6, and showing the gearing within the boring head at one end of the latter;

Fig. 10 is a cross-sectional view, taken on the line approximately indicated by the line 10—10 of Fig. 8, and showing the gearing within the boring head, at the other end of the latter;

Fig. 11 is a cross-sectional detail, taken on the line 11—11 of Fig. 9;

Fig. 12 is a cross-sectional view, taken on the line 12—12 of Fig. 11;

Fig. 14 is a fragmentary detail view of the boring bar feed reversing mechanism;

Fig. 15 is a fragmentary cross-sectional view, taken on the line 15—15 of Fig. 14;

Fig. 16 is an enlarged elevational view of the head stock;

Fig. 17 is a fragmentary view, partly in section, showing a portion of the mechanism for transversely moving the head stock;

Fig. 20a is an enlarged cross-sectional view, taken on the line 20a—20a of Fig. 22;

Fig. 24 is an elevation of one of the leveling jacks;

Fig. 25 is a plan view of one end of the leveling jack;

Fig. 26 is a cross-sectional view of one of the leveling jacks, taken on the line 26—26 of Fig. 25;

Fig. 27 is a detail of one of the anchoring bolts;

Fig. 28 is a view, similar to Fig. 12, but showing a modification, and

Fig. 29 is a cross-sectional view, taken on the line 29—29 of Fig. 28.

Figure 1:
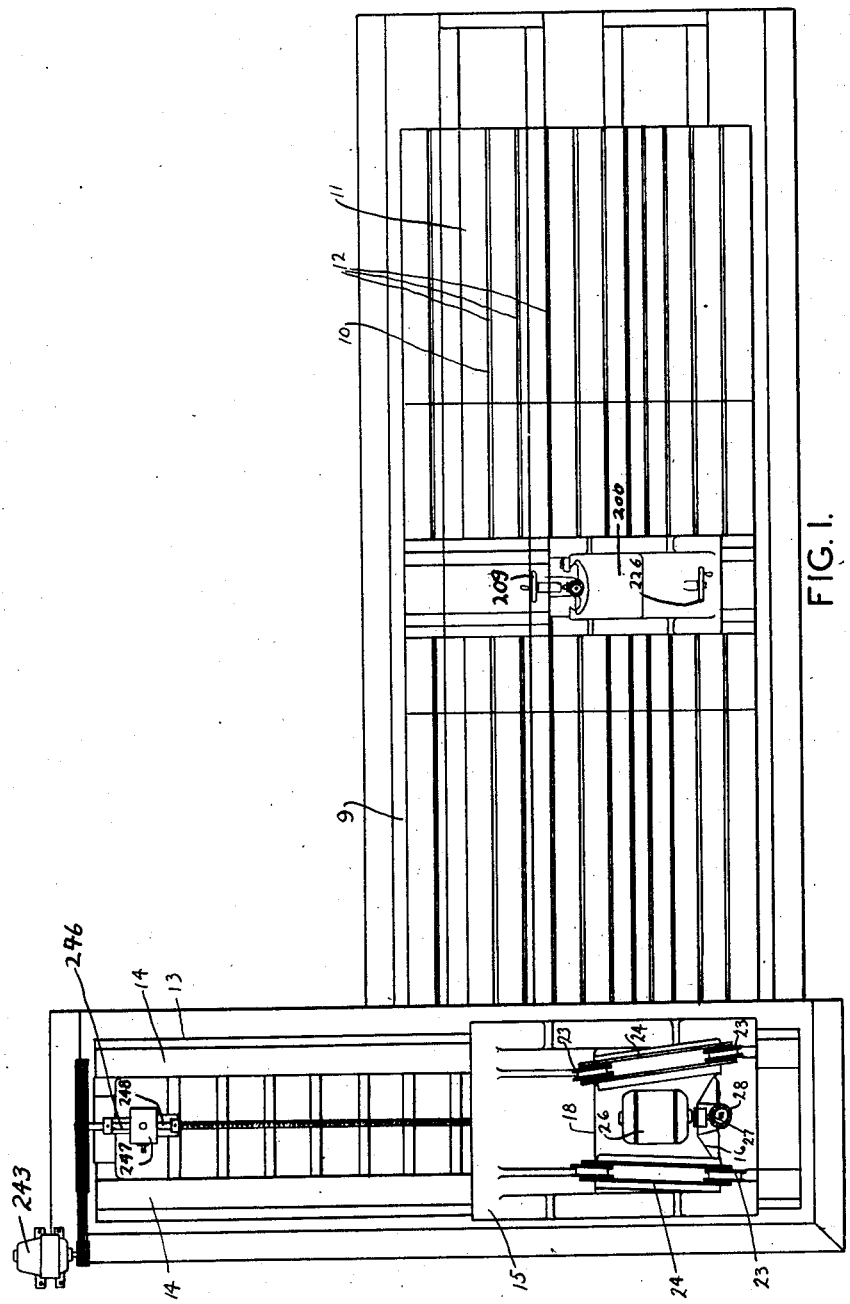
Fig. 1 is a plan view showing the foundation and relative location of the head and tail stocks of the boring machine.
Figure 2:
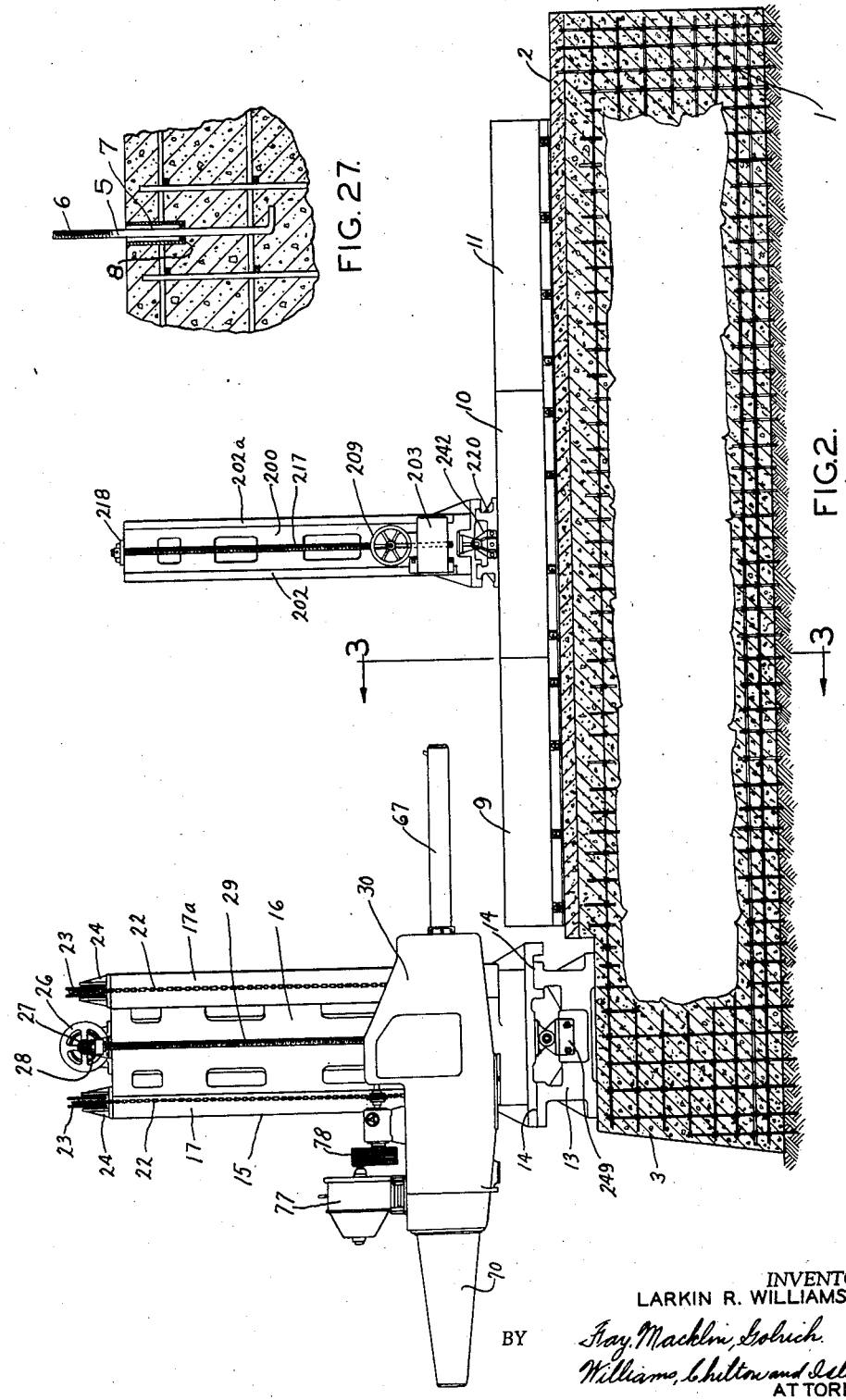
Fig. 2 is a front elevation of the boring machine.
Figures 3, 6, 7:
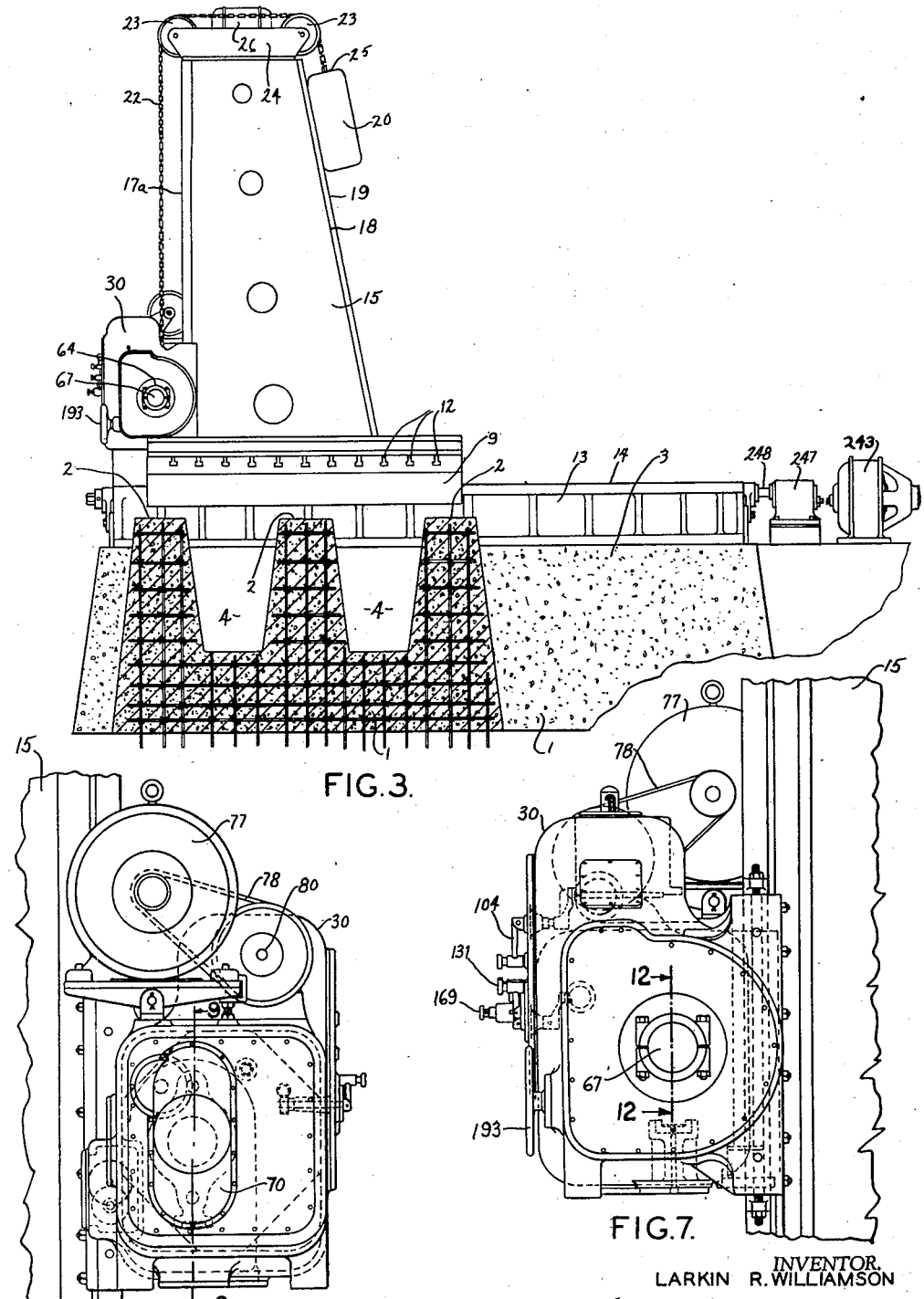
Fig. 3 is a cross-sectional view, taken on the line 3—3 of Fig. 2, and showing the head stock in elevation.
Fig. 6 is a rear end elevation of the boring head.
Fig. 7 is a front end elevation of the boring head.
Figure 13:
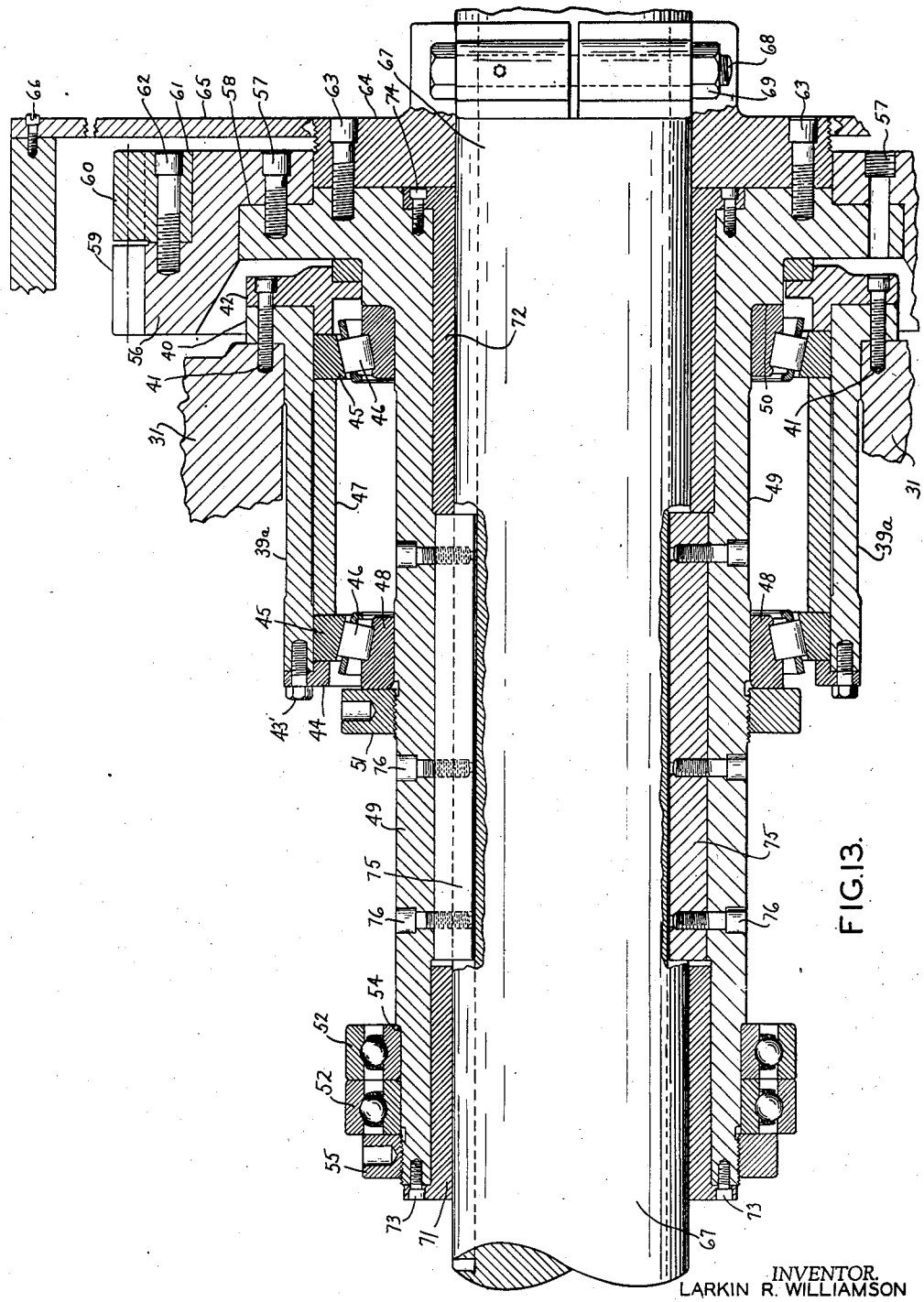
Fig. 13 is a cross-sectional view of the boring bar rotating mechanism.
Figure 18:
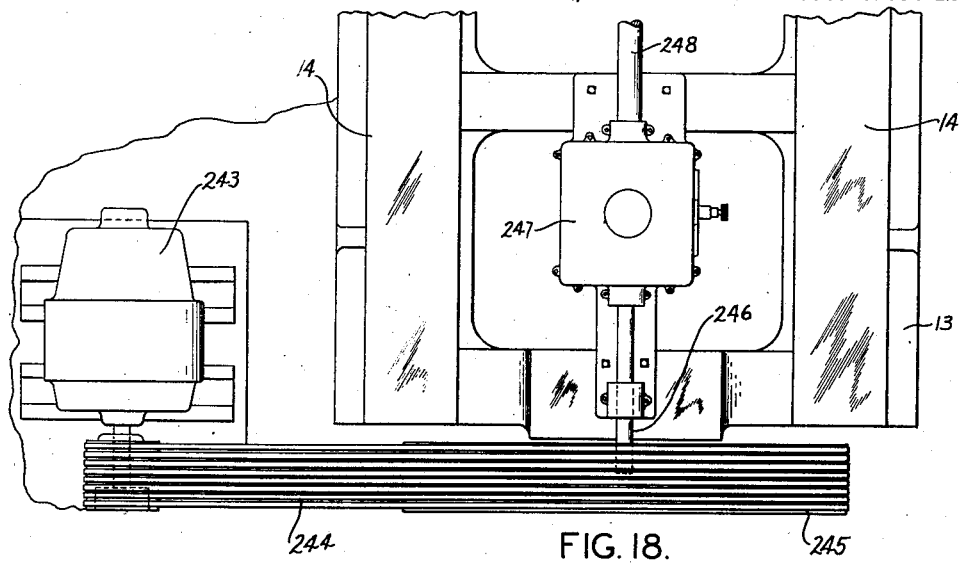
Fig. 18 is a plan view, indicated by the line 18—18 of Fig. 17, and showing the balance of the mechanism for transversely moving the head stock.
Figure 19:
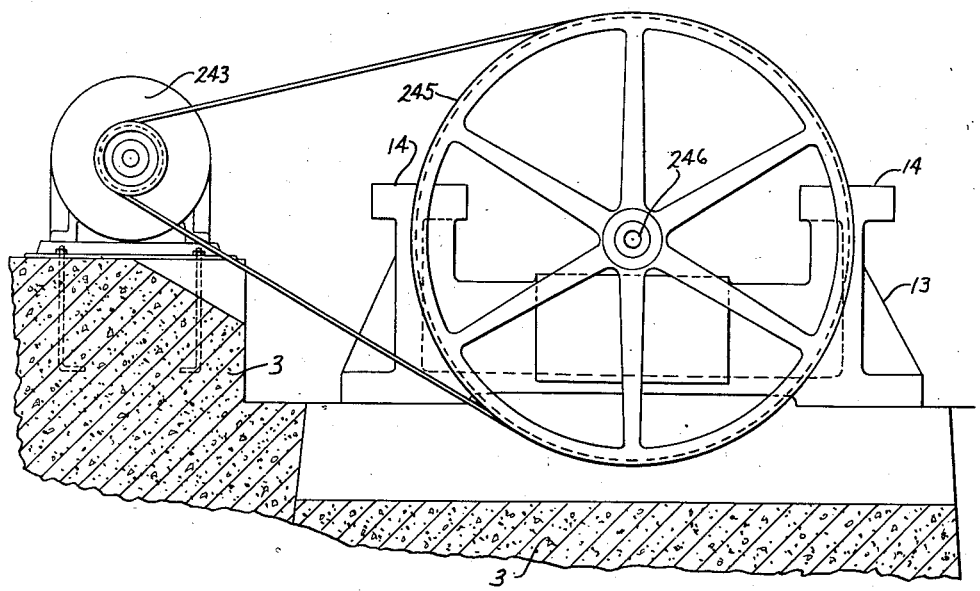
Fig. 19 is an elevational view of the mechanism shown in Fig. 18.

The boring mill is mounted on a foundation which is generally shown in Figs. 1, 2 and 3, and consists of a monolithic reinforced concrete structure 1, the depth of which is governed to a great extent by the type of soil on which the mill will be set. For the greater portion of its length, the structure 1 comprises a plurality of transversely spaced abutments 2, the upper surfaces of which are disposed substantially at the floor line or ground level. One end 3 of the structure 1 extends transversely of the ends of the abutments 2 and has its upper surface disposed somewhat below the upper surfaces of the said abutments. The spaces 4 between the abutments 2 form walks or passageways for inspection purposes.

For the purpose of locating the table and bed on the aforesaid foundation and anchoring them to the foundation, bolts 5 having upwardly projecting threaded ends 6 are set or sunk in the concrete structure at suitably spaced points, in the manner clearly shown in Fig. 27, the portions of these bolts immediately below the threaded ends 5 passing through pipes 7 which surround the bolts in spaced relation to the latter, wooden plugs or blocks 8, being interposed between the bolts and the lower ends of the pipes to prevent cement from entering these pipes at the time the foundation is poured. Prior to anchoring the table and bed to the aforesaid anchor bolts, the table and bed may be leveled by means of jacks interposed between the foundation and the table and bed at suitably spaced points. These jacks are shown in Figs. 24, 25 and 26, and each jack comprises a pair of wedge-shaped blocks 300 and 301, one of the blocks being disposed on the foundation and the other against the lower surface of the table or bed. Between each pair of blocks is interposed a wedge 302, to one end of which is threadedly secured an adjusting screw 303, which passes through a pressure block 304 which abuts one end of each of the blocks 300 and 301, and which has secured to its end a nut 305. By turning the nut 305, the wedge 302 is moved endwise, causing the block 301 to move relatively to the block 300. In this way, the table and bed, to be now described, may be easily and quickly leveled.

Table

The table of the boring mill is best shown in Figs. 1, 2, 3, 20 and 21, and is formed in three sections 9, 10, and 11, each section being anchored to the bolts 5, and having transversely spaced longitudinally extending T-slots 12 in its upper surface, the slots of the three sections being aligned with each other. These T-slots are for the reception of the heads of bolts or other fastening devices for securing the work to the table.

Bed

The bed or base for the head stock of the mill is best shown in Figs. 1, 2, 3, 16 and 17, and comprises a hollow casting 13 which is adjustably secured to the bolts 5 which project from the end 3 of the structure 1, and is provided at its upper portion with ways 14 for the movement therealong of the head stock.

Head stock

The head stock or support or housing for the boring head is best shown in Figs. 1 to 7, 16 and 17, and comprises an upright hollow casting 15, one face 16 of which is provided with vertically-extending ways 17 and 17a for the movement therealong of the boring mill head, and the opposite face 18 of which is inclined and provided with ribs 19 forming tracks for the movement therealong of a counterweight 20 for the boring head. The counterweight has secured thereto eyebolts 21 to which, in turn, are secured chains 22 which pass over sheaves 23 journalled in brackets 24 mounted on the casting 15, and have their ends secured to the boring head, as at 25.

For the porpose of elevating or lowering the boring head, a reversing motor 26 is provided, which is mounted on the casting 15 between the brackets 24, and which, through the intermediary of bevel gears 27 and 28 drives a screw 29, which is in threaded engagement with the boring head, generally indicated by the reference numeral 30.

Boring head

The boring head is best shown in Figs. 2 to 15 inclusive, and comprises a housing 31 formed from a casting, which has been bored and otherwise machined for the reception of the various shafts and other parts to be now described.

The housing 31 is recessed as at 32 and 32a for the reception of the ways 17 and 17a respectively, and gibs 33 are secured to the head at these points for the purpose of maintaining the head in engagement with the ways at all times. For the purpose of taking up wear between the way 17a and the recess 32a in the housing, tapered gibs 34 and 35 (Figs. 4, 5 and 9) are interposed between this way and recess, and may be vertically adjusted by means of adjusting screws 36, and locked in adjusted position by means of nuts 37.

The housing 31 (see Figs. 9 and 13) is cored as at 38 and 39 for the reception of a cast iron outer bushing 39a provided with a flange 40 at one end through which bolts 41 are passed for the purpose of securing the bushing 39a to the housing. The bolts 41 also serve to secure to the bushing a cap 42. Secured to the other end of the housing, as by means of bolts 43, is a ring 44, which, together with the cap 42, serves to retain in position within the bushing 39a the outer races 45 of tapered roller bearings 46, a spacer bushing 47 serving to suitably space these races apart. The inner races 48 of the bearings 46 have journalled therein a hollow spindle 49, which is retained against axial displacement by means of a shoulder 50 which bears against one of the races 48 and an adjusting nut 51 which is threadedly secured to the spindle and bears against the other race 48. The spindle 49 is also journalled in roller bearings 52 which are mounted in an opening 53 in the housing 31, and are retained against endwise displacement by a shoulder 54 on the spindle and an adjusting nut 55 which is threadedly secured to the spindle.

The spindle 49 is adapted to be driven by a gear 56 which is secured as by screws 57 to a flange 58 of the spindle, and which is preferably provided with a double set of gear teeth, one set 59 of which is formed integrally with the gear, and the other set 60 of which is formed on an annular member 61 removably secured to the gear 56 by means of screws 62. The teeth of the gear set 60 are preferably in staggered relation to those of the gear set 59, so as to reduce to a minimum the tendency toward teeth shear. Also secured to the flange 58 of the spindle, as by means of screws 63, is a spindle clamp 64, which extends through an opening in a cover plate 65 secured to the housing 31, as by screws 66. The clamp 64 is clamped to a boring bar 67 by means of bolts 68 and nuts 69. The boring bar 67 projects forwardly from the boring head housing to any desired length and is provided with boring tools or other cutting or machining devices of conventional or special design. It projects rearwardly from the housing 31 into a boat tail 70 removably secured to the other end of the housing.

The boring bar 67 is mounted within bushings 71 and 72 respectively secured to the ends of the spindle as by means of socket head screws 73 and 74, and is keyed to the spindle by means of keys 75, which are removably secured to the spindle by hollow head cap screws 76.

*Boring bar rotating mechanism*

For the purpose of rotating the boring bar, mechanism is provided, which is best shown in Figs. 2, 4, 5, 6, 7, 9 and 10.

Such mechanism includes a reversing motor 77 which is mounted on the housing 31, and which, through V-belts 78, drives a V-belt pulley 79, which, in turn, drives a shaft 80 journalled in roller bearings 81 and 82 secured within the housing. The drive from the pulley 79 to the shaft 80 is preferably through a speed control 83 and a flexible coupling 84. The speed control 83 is preferably a manually-operated control, such for example as the "Flexoid" speed control. The shaft 80 has keyed thereto a pinion 85, which is in mesh with a gear 86 keyed to a shaft 87, which is journalled in needle bearings 88 and 89 and in a roller bearing 90 secured within the housing.

The shaft 87 has revolubly mounted thereon, as by means of needle bearings 91 and 92 respectively, a high speed gear 93 and a low speed pinion 94, between which is interposed an axially shiftable clutch 95, which is keyed to the shaft and is selectively movable into driving engagement with either the gear or pinion, but which is shown in the drawings as in neutral position. The high speed gear 93 is in driving engagement with a high speed pinion 96, while the low speed pinion 94 is in driving engagement with a low speed gear 97, the pinion 96 and gear 97 being keyed to a drive shaft 98 which is journalled in needle bearings 99 and 100, and the roller bearing 101 mounted in the housing 31. The shaft 98 has mounted on one end thereof pinions 102 and 103 which are respectively in mesh with the gear teeth 59 and 60.

The clutch 95 is adapted to be manually shifted by means of a clutch shifting lever 104 (Figs. 4, 5 and 7) which is accessible to the operator from the outside of the housing 31. By shifting the clutch 95 to the left, as viewed in Fig. 9, the gear 93 and pinion 96 will be driven, thereby imparting a high speed rotation to the boring bar, the pinion 94 idling on the shaft 87 during such rotation. By shifting the clutch 95 to the right, as viewed in Fig. 9, the pinion 94 and gear 97 will be driven, thereby imparting a low speed rotation to the boring bar, the gear 93 idling on the shaft 87 during such rotation.

*Boring bar feeding mechanism*

For the purpose of imparting a traversing or feeding movement to the boring bar 67, mechanism is provided which is best shown in Figs. 8, 9, 10, 11 and 12, it being understood that when the bar is thus to be fed, the clamp 64 is released from the bar.

Such mechanism is driven by the shaft 98, which, for this purpose is splined at one end to provide gear teeth 105 which mesh with a gear 106 which is keyed to one end of a speed change shaft 107 journalled in sleeve bearings 108 and 109 in the housing 31. This speed change shaft is made in several parts, including an outer or sleeve portion 110, an inner portion 111, which is telescopically movable into and out of the portion 110, and an extension 112 which is threadedly secured to the portion 111 of the shaft, the extension 112 having mounted thereon a rack 113, with which a pinion 114 meshes.

Revolubly mounted on the speed change shaft are a plurality of speed change gears 115, 116, 117 and 118, which are in mesh with complementary teeth on a speed change gear unit 119, which is keyed to a shaft 120, which, for reference purposes, may be termed the first intermediate shaft, this shaft being journalled as at 121, 122 and 123, in the housing 31.

The inner portion 111 of the speed change shaft has a radial slot 124 therein, in which is pivotally mounted a key 125, which is normally resiliently urged out of the slot by means of a spring 126, one end of which is secured to the shaft portion 111, and the other end of which bears against the key. The key, as thus resiliently urged outward from the slot, is adapted to enter any one of the keyways 127, 128, 129 and 130 formed in the respective gears 115, 116, 117 and 118, to thus establish a drive between the speed change shaft and the selected gear. In order to change the speed of such drive, the key 125 may be moved longitudinally of the shaft to a position opposite anyone of the keyways 127, 128, 129 and 130, and will, when thus moved, automatically seat in the keyway opposite which the key is stopped. For this purpose, a lever 131 (Figs. 4 and 5) is provided on the face of the boring head housing, which is connected to the pinion 114, so that by rotating the lever, the pinion may be rotated in either direction to thereby move the shaft portion 111 in or out of the sleeve portion 110 of such shaft. Index marks 132 may be provided on the face of the housing 31 to indicate the position of the key 125, and thus determine the speed of the boring bar feed.

The shaft 120 has keyed thereto, at a point adjacent the bearing 121, a pinion 133, which, through a reversing mechanism to be presently described, drives a gear 134 keyed to the end of a shaft 135 which may be termed the second intermediate shaft. The shaft 135 is journalled in bearing portions 136 and 137 of the housing 31, and has revolubly mounted thereon a high speed gear 138 and a low speed pinion 139, between which is interposed an axially shiftable coupling clutch 140, which is keyed to the shaft and is selectively movable into driving engagement with either the gear or pinion, but which is shown in the drawings as in neutral position. The high speed gear is in driving engagement with a high speed gear 141, while the low speed pinion is in driving engagement with a low speed gear 142, the gears 141 and 142 being keyed to a driven shaft 143 which is journalled in bearing portions 144, 145 and 146 of the housing 31. The clutch 140 is adapted to be manually shifted by means of a clutch shifting lever 140a (Fig. 4), which is accessible to the operator from the outside of the housing 31. By shifting the clutch 140 to the left, as viewed in Fig. 10, the gears 138 and 141 will be driven, thereby imparting a high speed rotation to the shaft 143, the pinion 139 idling on the shaft 135 during such rotation. By shifting the clutch 140 to the right, as viewed in Fig. 10, the pinion 139 and gear 142 will be driven, thereby imparting a low speed rotation to the shaft 143, the gear 138 idling on the shaft 135 during such rotation.

The shaft 143, which may be termed the third intermediate shaft, has keyed to one end thereof a pinion 147, which through an idler gear 148, drives a pair of idler gears 149 and 150, which, in turn, are in mesh with gears 151 and 152, which are keyed to the ends of saddle feed screws 153 and 154. This arrangement of the gears causes the saddle feed screws to be rotated in the same direction, upon rotation of the pinion 147, the direction of rotation being, of course, dependent upon the direction of rotation of this pinion. The screws 153 and 154 are mounted adjacent the gears 151 and 152 in roller bearing units 154a and 155, which are mounted in the housing 31. The roller bearing units 154a and 155 are disposed at diametrically opposite points adjacent the periphery of a bushing 156 which is mounted in the housing 31, and through which the boring bar slides during the feeding movement thereof.

The feed screws 153 and 154 are threaded for the major portion of their length, and the ends thereof opposite those to which the gears 151 and 152 are secured, are in threaded engagement with saddle feed bearings 157 and 158, preferably made of bronze, and removably mounted in diametrically opposite ears formed on a saddle feed casting 159 which is mounted on a bearing 160, which is removably secured to the boring bar 67, as by means of a taper pin 161. The taper pin is locked in position by means of a spring-pressed detent 162 (Fig. 11) which is mounted in the bearing 160, and extends into an annular recess 163 in the taper pin. The taper pin can be easily removed by driving it out of the bearing 160, the detent being pushed rearwardly out of the recess 163 when the pin is thus driven out. It will be apparent from the foregoing that rotation of the feed screws 153 and 154 in either direction serves to effect a longitudinal movement of the boring bar 67. The casting 159 is guided in its longitudinal movement by a track or guide 159a secured within the housing 31.

Feed reversing mechanism

As previously stated, the pinion 133, which is keyed to the shaft 120, drives the gear 134 through a reversing mechanism. This mechanism is best shown in Figs. 10, 14 and 15, and comprises a feed reversing arm 164 which is mounted for pivotal movement about a hub 165 on the shaft 120. The arm 164 has mounted thereon pinions 166, 167 and 168, the pinion 133 being in mesh with the pinion 166, and in driving engagement with the pinion 168 through the pinion 167, which is an idler pinion.

By swinging the arm 164 to bring the pinion 166 in mesh with the gear 134, the latter will be driven in one direction, and by swinging the arm 164 to bring the pinion 168 in mesh with the gear 134, the latter will be driven in the opposite direction. This selective movement of the arm 164 is effected manually by means of a shaft 169 which is mounted for reciprocal movement in a sleeve 170 secured to the face of the housing 31, the shaft being pivotally connected at its inner end to a link 171, which, in turn, is pivotally connected to the lower end of the arm 164.

The shaft 169 has a series of longitudinally spaced annular recesses 172, 173 and 174 therein, which recesses are adapted to receive a spring-pressed ball 175.

When the shaft 169 is pushed inwardly to such an extent that the ball 175 enters the recess 172, the pinion 168 is in mesh with the gear 134, and the latter is driven in one direction. When the shaft 169 is pulled outwardly to such an extent that the ball 175 enters the recess 174, the pinion 166 is in mesh with the gear 134, and the latter is driven in the opposite direction. In the event that an unusual obstruction is encountered in the boring, drilling or milling operations, a resistance to the rotation of the gear 134 is set up, which reacts on the pinions 166 or 168, as the case may be, to force these pinions away from the gear, thereby moving the shaft 169 in a direction which brings the recess 173 thereof opposite the ball 175, with the result that the ball enters this recess and latches the parts in a neutral position in which neither of the pinions 166 or 168 is in mesh with the gear 134. There is thus provided a safety feature, which is automatic in its operation, and which insures against operation of the mill until the obstruction has been removed or otherwise attended to.

Rapid traverse mechanism for boring bar

It is desired, at times, as when the work to be bored, drilled, milled or otherwise machined, is at some distance from the boring head, and in order to rapidly bring the cutting or milling tools to and from the work, to effect a more rapid feed of the boring bar than obtained by the feed mechanism which has been described.

This is accomplished by means of a reversing motor 176 (Figs. 8 and 10), which is mounted on the housing 31, and which, through a shaft 177 provided with a pinion 179 at one end, drives a gear 180 which is secured as by means of screws 181, to the gear 151.

When it is desired to obtain a rapid traversing movement of the boring bar, the clutch 140 is disposed in a neutral position, in order to avoid transmission of movement to the shaft 135, and the motor 176 is energized for rotation, in either direction, as desired. In either case, a rapid movement is imparted to the boring bar through the intermediary of pinion 179, gears 180, 151, 149, 148, 150 and 152, the gears 151 and 152 in this way imparting movement to the screws 153 and 154. Movement is imparted at the same time to pinion 147, shaft 143, pinion 141 and gear 142, but since the clutch 140 is in neutral position, no movement will thereby be imparted to the shaft 135.

Manual feed of boring bar

Means have also been provided for manually feeding the boring bar, whenever desired.

Such means is best shown in Figs. 4, 5 and 10, and includes a hand feed wheel 193 which is accessible from the front of the housing 31, and is secured to one end of a shaft 194 which is revolubly mounted in the housing. The shaft 194 has keyed to its inner end a bevel pinion 195 which meshes with a bevel pinion 196, secured to one end of a shaft 197 journalled in the housing 31.

Shaft 197 has secured to its opposite end a pinion 198, which is in mesh with the gear 142. The gear 142 drives the saddle feed screws 153 and 154 in a manner which has been previously described.

When it is desired to manually feed the boring bar, the clutch 140 is first moved to its neutral position. The hand wheel 193 is then rotated in either direction, as desired, thereby transmitting movement to the saddle feed screws, as described. Movement is at the same time imparted to the shaft of motor 176, but this movement is of no consequence. Since the clutch 140 is in neutral position, movement of the hand wheel 193 is not transmitted to the shaft 135. When the motor 176 is in operation, as when a rapid movement of the boring bar is desired, as hereinbefore described, the hand wheel 193 is also rotated, due to the fact that the gear 142 is in mesh with the pinion 198, but the speed of rotation of the hand wheel at such times is not so great as to require means for declutching the hand wheel.

Tail stock

The tail stock is best shown in Figs. 1, 2, 20, 21, 22 and 23.

Referring to the aforesaid figures, it will be seen that the tail stock comprises a support or housing 200 in the form of a hollow upright casting similar to the casting 15, and one face 201 of which is provided with vertically-extending ways 202 and 202a for the movement therealong of a slide 203, which is secured against displacement from these ways by means of a gib 205.

The slide 203 has a circular bore or opening 204a provided with a bushing 205a into which the boring bar extends during certain operations of the mill, the boring bar having a running fit in said bushing. Mounted on the slide and secured thereto, as by means of screws 206, is a bracket 207, in which is journalled a shaft 208, having a hand wheel 209 secured to its squared outer end. The shaft 208 has a pinion 210 formed on its inner end, which pinion is in mesh with a bevel gear 211 secured to a spindle 212. The spindle 212 extends through a bushing 213 which is mounted on and rigidly fastened to the slide 203.

The spindle 212 is hollow and has mounted therein a bronze adjusting nut 214, a key 215 securing the nut and spindle against rotation relatively to each other. The nut 214 is clamped to the spindle 212 by means of a clamp 216. The nut 214 is interiorly threaded and is in threaded engagement with a vertically extending screw 217. The screw 217 is supported by means of a bracket 218 secured to the upper end of the housing 200 by means of screwbolts 219.

Figure 20:
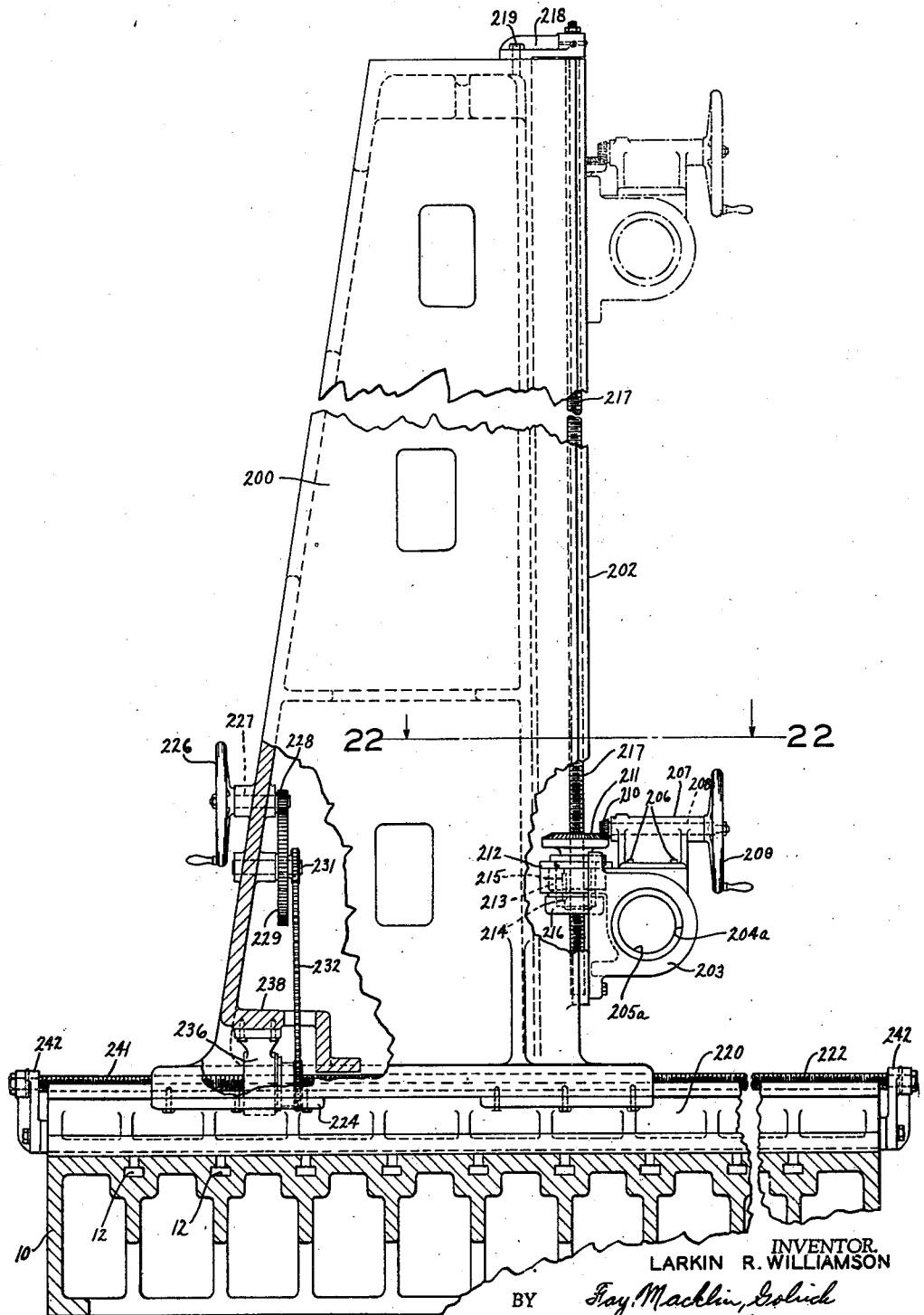
Fig. 20 is a side elevation of the tail stock.
Figure 22:
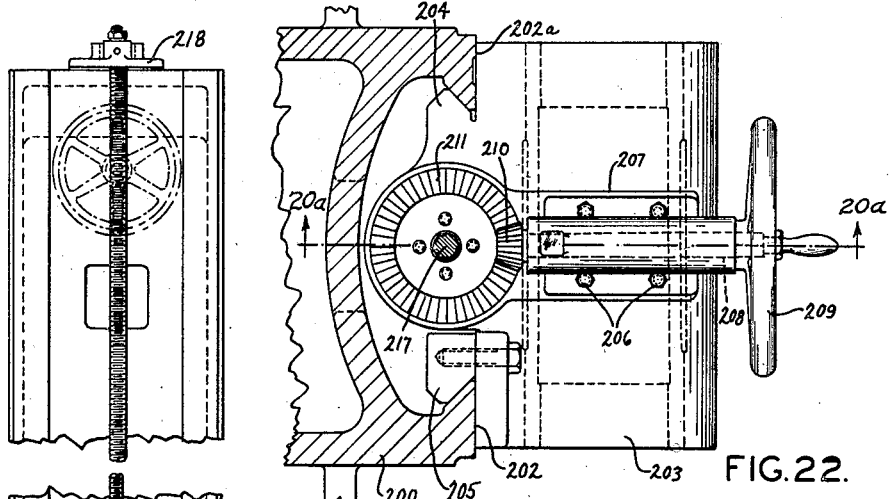
Fig. 22 is a cross-sectional view, taken on the line 22—22 of Fig. 20.
Figures 21, 23:
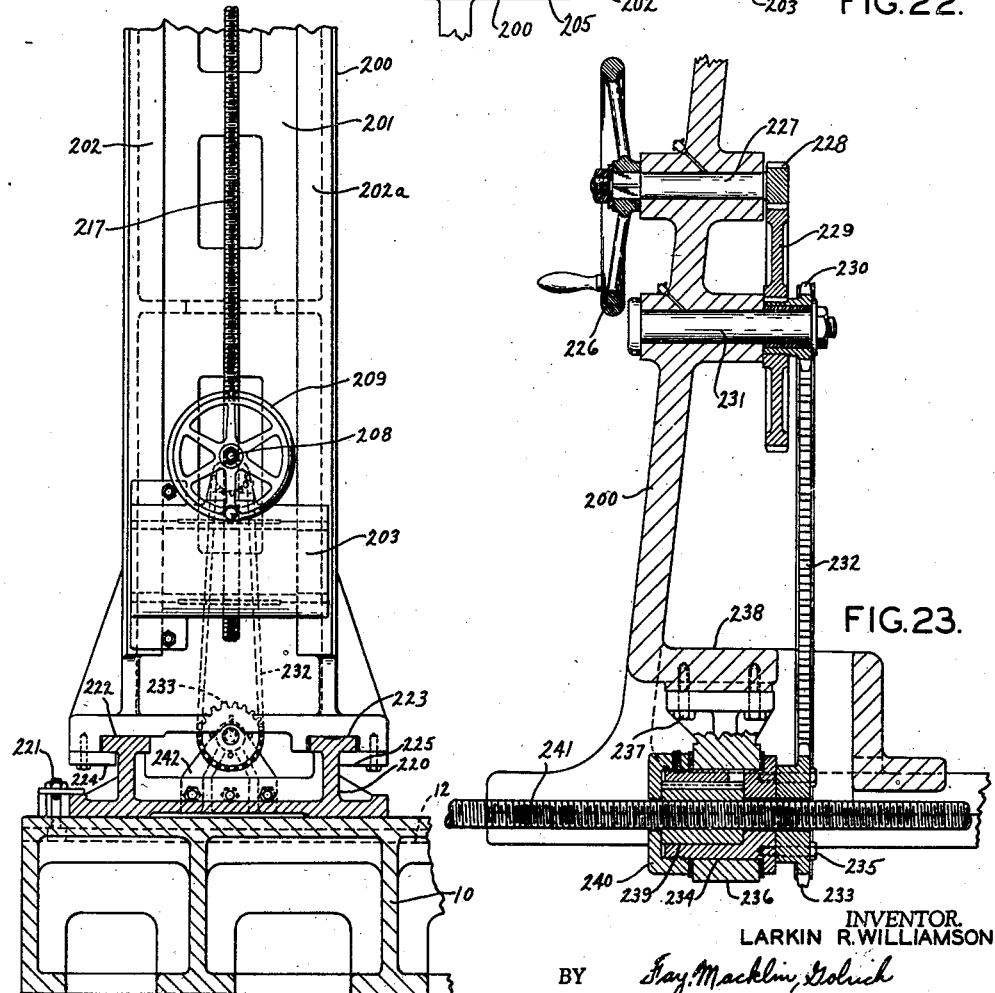
Fig. 21 is a front elevation of the tail stock.
Fig. 23 is an enlarged detail of a portion of Fig. 20.

It will be apparent from the foregoing that the slide 203 may be vertically adjusted to any desired position by merely rotating the hand wheel 209, one position of the slide being indicated in solid lines in Fig. 20, while another position of such slide is indicated by the dotted lines in this figure.

The tail stock housing 200 is mounted on the base 220 which comprises a hollow casting similar to the casting 13, the base being mounted on the table of the boring mill, and being longitudinally adjustable along such table. It is maintained in adjusted position by means of bolts 221 (Fig. 21) having heads movable in the T-slots 12 in the upper surface of the table. In other words, the base 220 is mounted on the table of the boring mill in a manner similar to that in which the work is secured to the table.

The housing 200 is also movable transversely of the table 12, that is to say, longitudinally of the base 220. For this purpose, the base 220 is provided on its upper surface with ways 222 and 223 for the movement therealong of the housing, the housing being maintained against displacement from such ways by means of gibs 224 and 225 removably secured to the housing.

For the purpose of moving the housing 200 to any desired position along these ways, mechanism is provided, which is somewhat similar to that employed for moving the slide 203. Such mechanism includes a hand wheel 226 secured to the squared outer end of a shaft 227 which is journalled in the housing 200. The inner end of this shaft is formed as a pinion 228, this pinion meshing with a gear 229 which is keyed to a sprocket 230 revolubly mounted on a shaft 231 which is mounted in the housing 200 at a point below the shaft 227.

The sprocket 230 is in driving engagement with an endless sprocket chain 232, which, in turn, drives a sprocket 233 secured to a spindle 234 as by means of screws 235. Spindle 234 is revolubly mounted in a bracket 236 which is secured as by screws 237 to an inwardly extending portion 238 of the housing 200. Disposed within the spindle 234 is a bronze nut 239 which is keyed to rotate with the spindle, the nut being clamped to the spindle by means of a clamp 240.

The nut 239 is in threaded engagement with a screw 241 which extends through the base 220, and is supported on such base by means of upstanding brackets 242.

It will be apparent from the foregoing description, that the tail stock may be adjusted transversely to any desired position by merely rotating the hand wheel 226.

Means are also provided for adjusting the head stock to any desired position along the bed 13. Such mechanism is best shown in Figs. 1, 2, 16, 17, 18 and 19, and comprises a reversing motor 243 mounted on the foundation 3, which motor drives V-belts 244, which, in turn, drive a flywheel 245. The flywheel 245 is mounted on one end of a shaft 246, which, through a change gear unit 247, drives a screw 248 either at high or low speed. The screw 248 is similar to the screw 241, and is journalled in bracket bearings 249 mounted on the bed 13.

The screw 248 is threadedly secured to nuts 250 which are rigidly secured to the head stock, so that rotation of the screw 248 results in movement of the head stock along the ways 14 of the bed.

The operation of the machine will be readily understood from the foregoing description thereof, but certain specific aspects of such operation may be described to advantage.

When the boring bar is to be used for boring cylindrical openings in castings or for drilling, the clamp 64 is clamped to the bar, and the clutch 140 is moved to neutral position, as shown in Fig. 10, so that no reciprocal movement is imparted to the boring part. If the work is of such nature as to require protrusion of the bar through the work, the free end of the bar, which would otherwise be unsupported and subjected to cantilever stresses, is preferably supported in the bushing 205a in the slide 203.

During reciprocal movement of the boring bar, the clamp 64 is, of course, released from clamping engagement with the bar, so as not to interfere with such movement.

For milling operations, the head stock is caused to traverse the bed 13 by means of the motor 243.

In Figs. 28 and 29, I have illustrated a modification of the saddle screw connection to the boring bar described in connection with Figs. 9, 11 and 12. In this modification, each of the screws 153 and 154, instead of being connected to a single saddle feed bearing such as 157 or 158, is connected to a pair of nuts 157a and 157b. By turning these nuts in opposite directions, wear between the screws and nuts can be readily taken up. In this case, moreover, the saddle feed casting 159' is mounted on a roller thrust bearing 160' of a special type, as shown.

It is thus seen that I have provided a machine which adequately fulfills all of the objects of the invention hereinbefore set forth, and which is of rugged durable construction, as well as proper design.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a machine of the character described, a boring bar, means for imparting axial movement to said bar, and means for reversing the direction of movement of said bar, said reversing means comprising a shaft, a gear mounted thereon, a second shaft parallel with said first shaft, an arm pivotally mounted on said second shaft, said arm carrying a series of pinions driven by said second shaft, and push-pull means pivotally connected to said arm and accessible from the exterior of said machine, and adapted when moved in one direction to cause movement of said arm to bring certain of the pinions thereon in driving engagement with said gear to drive said gear in a predetermined direction, and when moved in the opposite direction to cause movement of said arm to bring others of said pinions into driving engagement with said gear to drive said gear in the opposite direction.

2. In a machine of the character described, a boring bar, and means for imparting axial movement to said bar, said means comprising a sleeve pinned to said bar, a thrust bearing surrounding said sleeve, said sleeve being revoluble in said bearing, a casting surrounding said bearing and having openings therein at diametrically opposite points, a pair of nuts mounted in each opening, a saddle feed screw in threaded engagement with each pair of nuts, said nuts being adjustable to take up wear between the nuts and screws.

3. In a machine of the character described, a housing, a spindle revolubly mounted in said housing, a boring bar keyed to said spindle, a gear secured to said spindle for rotating the latter, said gear having a central bore, and means adapted to be clamped to said boring bar, said clamping means having a portion integral therewith secured directly to said spindle and disposed within the bore of said gear.

4. In a machine of the character described, a boring bar, means for imparting axial movement to said bar, means for reversing the direction of movement of said bar, said reversing means comprising a shaft, a gear mounted thereon, a second shaft parallel with said first shaft, an arm pivotally mounted on said second shaft, said arm carrying a series of pinions driven by said second shaft, and means adapted when moved in one direction to cause movement of said arm to bring certain of the pinions thereon in driving engagement with said gear to drive said gear in a predetermined direction, and when moved in the opposite direction to cause movement of said arm to bring others of said pinions into driving engagement with said gear to drive said gear in the opposite direction, said means comprising a shaft having a series of axially spaced recesses therein, and a spring-pressed element movable into said recesses.

5. In a machine of the character described, a boring bar, means for imparting axial movement to said bar, including a series of meshed gears, means automatically responsive to obstruction to movement of said bar for taking said gears out of mesh to thereby stop the axial movement of said bar, said means including a shaft having a recess therein and a spring-pressed element movable into said recess to maintain said shaft in the position it assumes when said gears are out of mesh.

LARKIN R. WILLIAMSON.